(12) United States Patent
Tsai et al.

(10) Patent No.: US 11,086,051 B2
(45) Date of Patent: Aug. 10, 2021

(54) BROADBAND META-OPTICAL DEVICE

(71) Applicant: Academia Sinica, Taipei (TW)

(72) Inventors: Din-Ping Tsai, Taipei (TW); Pin-Chieh Wu, Taipei (TW)

(73) Assignee: ACADEMIA SINICA, Taipei (TW)

( * ) Notice: Subject to any disclaimer, the term of this patent is extended or adjusted under 35 U.S.C. 154(b) by 240 days.

(21) Appl. No.: 15/599,943

(22) Filed: May 19, 2017

(65) Prior Publication Data

US 2018/0156949 A1   Jun. 7, 2018

(30) Foreign Application Priority Data

Dec. 5, 2016 (TW) .................... 105140070

(51) Int. Cl.
| | | |
|---|---|---|
| *G02B 5/00* | (2006.01) | |
| *G02B 1/00* | (2006.01) | |
| *G03H 1/02* | (2006.01) | |
| *G03H 1/08* | (2006.01) | |

(52) U.S. Cl.
CPC ............ *G02B 5/008* (2013.01); *G02B 1/002* (2013.01); *G03H 1/0244* (2013.01); *G03H 1/0891* (2013.01)

(58) Field of Classification Search
CPC .......... G02B 5/008; G02B 1/002; G02B 5/30; G02B 5/32; G02B 26/00; G02B 26/04; G02B 26/08; G02B 26/0816; G02B 5/00; G02B 1/00; G02B 26/0826; G02F 1/0009; G02F 1/0018; G02F 1/0063; G02F 1/01; G02F 1/0121; G02F 1/0126; G02F 1/00; G02F 1/0054; G02F 2203/10; B82B 1/00; B82B 1/008; B82B 3/00; B82B 3/0009; B82B 3/0014; B82B 3/0061; B82B 3/0066; G03H 1/0244; G03H 1/0891; B82Y 10/00; B82Y 20/00; B82Y 30/00
USPC ......... 359/244, 241, 32, 238, 280, 276, 278, 359/279; 977/773, 774, 712, 721, 723
See application file for complete search history.

(56) References Cited

U.S. PATENT DOCUMENTS

| | | | |
|---|---|---|---|
| 2013/0208332 A1* | 8/2013 | Yu .................... | G02B 1/002 359/240 |
| 2017/0068214 A1 | 3/2017 | Tsai et al. | |

FOREIGN PATENT DOCUMENTS

TW   I538875 B   6/2016

OTHER PUBLICATIONS

Chen et. al., "High-Efficiency Broadband Meta-Hologram with Polarization-Controlled Dual Images", Nano Lett. 2014, 14, 225-230.*

(Continued)

*Primary Examiner* — Jie Lei
(74) *Attorney, Agent, or Firm* — Birch, Stewart, Kolasch & Birch, LLP

(57) ABSTRACT

The present invention provides an optical component comprising a dielectric layer and a nanorod array; the nanorod array is formed on a surface of the dielectric layer and extends along a lateral direction and a vertical direction. The nanorod array comprises a plurality of nanorods extending along the dielectric layer. The nanorods have a gap between one another, and an angle is defined by two adjacent nanorods. A bump is formed at each of two ends of the nanorod.

10 Claims, 13 Drawing Sheets
(3 of 13 Drawing Sheet(s) Filed in Color)

(56) References Cited

OTHER PUBLICATIONS

Wu et al "Plasmon coupling in vertical split-ring resonator magnetic metamolecules"; 2015 International Conference on Numerical Simulation of Optoelectronic Devices (NUSOD),Taipei, NUSOD 2015, Sep. 7, 2015; p. 29-p. 30.*
Chu et al., "Active dielectric metasurface based on phase-change medium," Laser & Photonics Reviews, vol. 10, No. 6, 2016 (published online Oct. 13, 2016), pp. 986-994 (10 pages total).
International Search Report and Written Opinion of the International Searching Authority (Forms PCT/ISA/220, PCT/ISA/210 and PCT/ISA/237) for Application No. PCT/US17/62802, dated Mar. 9, 2018.
Zheng et al., "Metasurface holograms reaching 80% efficiency," Nature Nanotechnology, vol. 10, No. 4, 2015 (published online Feb. 23, 2015), pp. 1-5 (8 pages total).
Chen et al., "A review of metasurfaces: physics and applications," Reports on Progess in Physics, 79 076401 (published 2016), pp. 1-24.
Hsu et al., "Vertical split-ring resonator based anomalous beam steering with high extinction ratio," Scientific Reports, 5:11226 DOI 10.1038/srep11226, (published Jun. 8, 2015), pp. 1-6.
Huang et al., "Aluminum Plasmonic Multicolor Meta-Hologram," NANO Letters, 2015, 15, 3122-3127, (published Apr. 6, 2015), pp. 1-6.
Zheng et al., "Metasurface holograms reaching 80% efficiency," Nature Nanotechnology, vol. 10, No. 4, 2015 (published online Feb. 23, 2015), pp. 1-6.

* cited by examiner

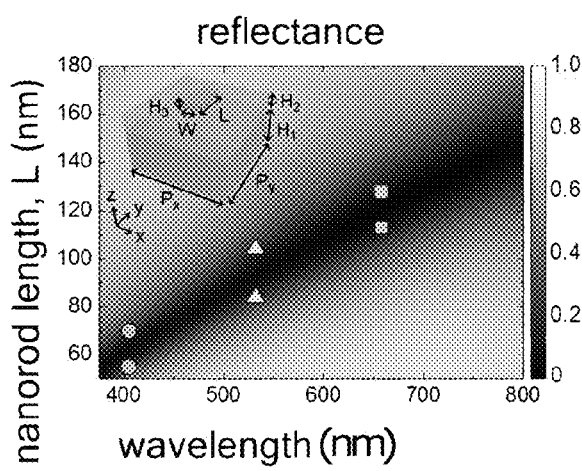
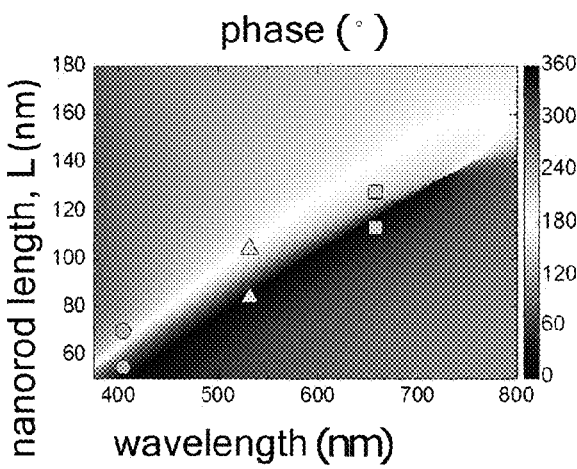
Fig.4(a)  Fig.4(b)
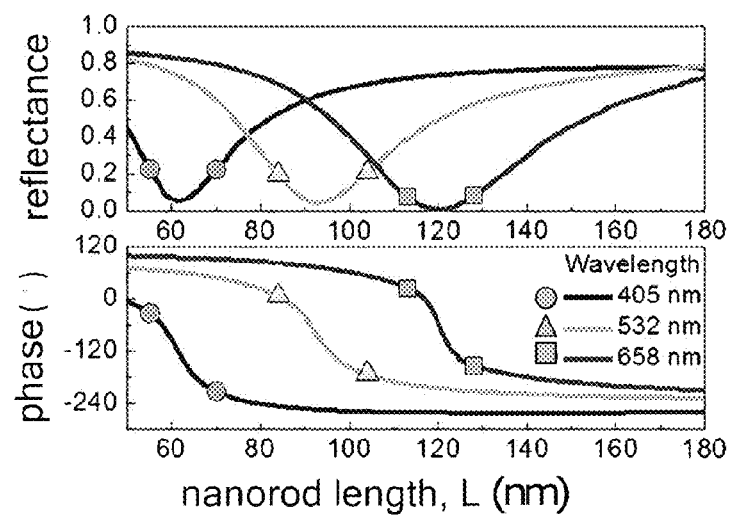
Fig.4(c)

BROADBAND META-OPTICAL DEVICE

BACKGROUND OF THE INVENTION

Field of the Invention

The present invention relates to an optical component/device, and more particularly, to a phase-modulated optical component/device using plasmonic coupling induced by nano-structure.

Description of the Prior Art

Optical components made of plasmonic metamaterials relate to the technical fields of nanomaterials and nanophotonics. Basically, a plasmonic metamaterial utilizes the anomalous optical phenomenon which is generated when resonance occurs for the electrons in a metal nanostructure. Particular applications of plasmonic metamaterials include realizations of, for example, negative index materials, super-lenses, phase modulation, holograms, etc.

For example, plasmonic metasurfaces utilize custom unit element with sub-wavelength nanostructures on metasurfaces to modulate the phase of incident light (i.e., the electromagnetic wave), so that wavefronts of electromagnetic waves can be altered.

For further example, a published article (D. P. Tsai et al, "High-Efficiency Broadband Anomalous Reflection by Gradient Meta-Surfaces," Nano Letters, 2012) discloses an example of a phase-modulated optical component consisting of a gold nanostructure, $MgF_2$ and a gold-mirror. This optical component is capable of achieving phase modulation to a large extent for operating wavelengths in the near-infrared. However, it does not perform so well for resonances with other wavelengths, and cannot achieve wavelength division multiplexing nor display in three primary colors.

In addition, two published articles, "Dual-polarity Plasmonic Metalens for Visible Light, Nat. Commun. 3, 1198 (2012)" and "Super-Dispersive Off-Axis Meta-Lenses for Compact High Resolution Spectroscopy, Nano Lett. 16, 3732-3737 (2016)" disclose approaches that introduce phase geometry into metasurfaces to realize visible and near-infrared metalens with multiple functions. Another two published articles, "Decoupling Optical Function and Geometrical Form Using Conformal Flexible Dielectric Metasurfaces, Nat. Commun. 7, 11618 (2016)" and "A Flat Lens with Tunable Phase Gradient by Using Random Access Reconfigurable Metamaterial, Adv. Mater. 27, 4739-4743 (2015)" respectively disclose a tunable metalens accomplished by using a microfluidic system (or an elastic material) together with a metasurface. These research results have made the metasurface a potential material for manufacturing metalenses, whereas the metasurfaces can be made into aberration-corrected flat lenses, as disclosed in the published articles "Aberration-Free Ultrathin Flat Lenses and Axicons at Telecom Wavelengths Based on Plasmonic Metasurfaces, Nano lett. 12, 4932-4936 (2012)", "Aberrations of Flat Lenses and Aplanatic Metasurfaces, Opt. Express, 21, 31530-31539 (2013)" and "Multiwavelength Achromatic Metasurfaces by Dispersive Phase Compensation, Science 347, 1342-1345 (2015)".

Achromatic metasurface lenses which have been disclosed so far are generally realized by integrating arrays of various structures into a chip to form metasurface lenses operable at multiple wavelengths, and are able to overcome chromatic aberrations at particular wavelengths; examples can be found in the published articles "Achromatic Metasurface Lens at Telecommunication Wavelengths, Nano let. 15, 5358-5362 (2015)" and "Multiwavelength Polarization-insensitive Lenses based on Dielectric Metasurfaces with Meta-molecules, Optica 3, 628-633 (2016)". Although a different kind of dielectric metasurface aiming to improve the above-described lenses has been proposed, chromatic aberrations, which can result in poor image quality, remain a problem for such metasurfaces.

Therefore, there is a demand for a broadband metasurface component/device with an improved capability of correcting chromatic aberrations, and the development thereof has been expected.

SUMMARY OF THE INVENTION

To enable optical components based on nanoplasmonic structures to be further applied to applications with shorter wavelengths and achieve display in three primary colors, an object of the present invention is to provide an optical component including: a dielectric layer and a primary nanorod array formed thereon. The primary nanorod array is formed on the dielectric layer to define a pixel, and is composed of a plurality of nanorod sub-arrays arranged in two-dimensional arrays. Each nanorod sub-array is composed of a plurality of nanorods arranged in two-dimensional arrays, and the nanorods within a same nanorod sub-array are rectangular rods of the same shape. Each nanorod has a width and a length, and the length direction serves as the direction of that nanorod. All the nanorods within a single nanorod sub-array have the same length and are of the same direction. Moreover, among the plurality of nanorod sub-arrays which belong to a single pixel, at least three nanorod sub-arrays are composed of nanorods having different lengths. The single pixel includes at least two nanorod sub-arrays along a width direction thereof, and at least two nanorod sub-arrays along a length direction thereof. The nanorods are made of metal which has a relatively higher plasma resonance, so that a broader operating wavelength range can be achieved to cover shorter wavelengths of the spectrum.

The present invention further provides a display apparatus based on the aforementioned optical component. The display apparatus according to the present invention includes a light source and the aforementioned optical component. The light source emits polarized light to the optical component, which projects an image in response to the incident polarized light. The pattern of the image is relevant to the arrangement of the pixels, and the colors of the image are determined by the light source and the lengths of the nanorods within the nanorod sub-arrays of the pixels.

The present invention also provides an optical component, including: a dielectric layer; and a nanorod array, formed on a surface of the dielectric layer and extending along a lateral direction and a vertical direction. The nanorod array consists of multiple types of nanorod patterns; each nanorod pattern is defined by one or more nanorods. Each nanorod pattern of said multiple types of nanorod patterns has a longitudinal axis defining an orientation thereof. The nanorod patterns of the same type are arranged adjacent to one another along the lateral direction and have the different orientations.

According to an embodiment of the invention, said nanorod pattern is defined by a plurality of nanorods that are arranged in parallel form.

According to an embodiment of the invention, said nanorod pattern is defined by a plurality of nanorods that are arranged perpendicular to each other.

According to an embodiment of the invention, an angle defined by the longitudinal axis of each of the nanorod patterns of the same type and the lateral direction reduces as the nanorod patterns of the same type extend along the lateral direction.

According to an embodiment of the invention, an angle defined by the longitudinal axis of each of the nanorod patterns of the same type and the lateral direction increases as the nanorod patterns of the same type extend along the lateral direction.

According to an embodiment of the invention, the nanorod patterns of the same type are arranged adjacent to one another along the vertical direction in the same orientation.

According to an embodiment of the invention, the nanorod array comprises a plurality of nanorods extending along the dielectric layer and having a gap between one another. An angle of 0.0 to 90.0 degree is defined by a longitudinal axis of each of the nanorods and the lateral direction, wherein the longitudinal axis is defined by a length of the nanorod, and the angle varies along the lateral direction. A bump is formed at each of two ends of the nanorod to form a shape of a split ring.

These and other features and advantages will be more apparent from the following detailed description of the embodiments and the appended claims.

BRIEF DESCRIPTION OF THE DRAWINGS

The patent or application file contains at least one color drawing. Copies of this patent or patent application publication with color drawing will be provided by the USPTO upon request and payment of the necessary fee.

FIGS. 4(a) to 4(c) illustrate reflectance and phase distribution of the nanoscale optical component according to the invention, both of which vary in accordance with the nanorod lengths (L) and the wavelengths.

DETAILED DESCRIPTION OF THE PREFERRED EMBODIMENTS

The nanoscale optical component exemplified in the present invention is a type of metasurface. In general, such metasurface has a plurality of metal nanostructures periodically arranged thereon, and the design and arrangement of those metal nanostructures are mostly related to phase modulation for electromagnetic waves. When an incident electromagnetic wave arrives at the metasurface, the metal nanostructure thereof is then excited and a plasmon resonance occurs, which causes the metal nanostructure to further radiate an electromagnetic wave. Compared to the incident wave, the radiated electromagnetic wave from the excited metal nanostructure has been altered in intensity and phase and is propagating in accordance with the generalized Snell's Law.

Generalized Snell's Law

Figure 1:
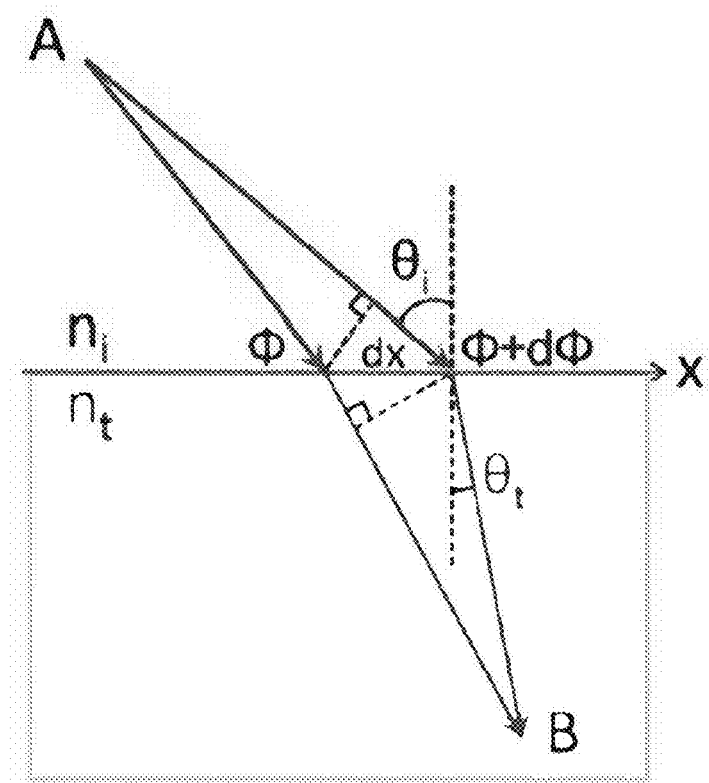
FIG. 1 illustrates schematics used to derive the generalized Snell's law.

With reference to FIG. 1, as far as a metasurface is concerned, an artificial structure (such as the metal nanostructure according to the present invention) configured on an interface defined between two mediums is capable of providing phase modulation for electromagnetic waves. Assuming that two incident rays arriving at the interface with phase shift are respectively denoted as $\phi$ and $\phi + d\phi$, wherein $\phi$ represents a function of position x, the incident ray propagated from position A to position B can be presented as the following equation:

$$[k_0 n_i \sin\theta_i dx + (\Phi + d\Phi)] - [k_0 n_t \sin\theta_t + \Phi] = \quad (1)$$
$$0 \Rightarrow \sin(\theta_t)n_t - \sin(\theta_i)n_i = \left(\frac{\lambda_0}{2\pi}\right)\frac{d\Phi}{dx},$$

where $\theta_t$ and $\theta_i$ respectively denote the angle of refraction and the angle of reflection, while $n_t$ and $n_i$ respectively denote the index of refraction in the incident medium and the index of refraction in the refracting medium.

Similarly with Eq. (1), under the same interface between the incident medium and the refracting medium, the incident ray, its relevant reflection ray (with an angle of reflection $\theta_r$) and their relation can be presented as the following equation:

$$\sin(\theta_r) - \sin(\theta_i) = \left(\frac{\lambda_0}{2\pi n_i}\right)\frac{d\Phi}{dx}. \quad (2)$$

Eq. (2) can be further manipulated by multiplying a wave vector of incident wave, $k_i$, to both sides of the equation, such that Eq. (2) is then transferred into a relationship showing the wave vector conversation in the horizontal direction extending along the interface. The transferred equations are shown as below:

$$k_{r,x} = k_{i,x} + \xi \quad (3.1)$$

$$k_{i,x} = k_i \sin \theta_i \quad (3.2)$$

$$k_{r,x} = k_i \sin \theta_r \quad (3.3)$$

$$\xi = n_i \left( \frac{d\Phi}{dx} \right) \quad (3.4)$$

where $k_{r,x}$ denotes the horizontal momentum of the reflection ray along the X direction, $k_{i,x}$ denotes the horizontal momentum of the incident ray along the X direction, and $\xi$ denotes a value associated with the change rate of the phase and which is also associated with the distance change at the interface (i.e. $d\phi/dx$). In other words, according to Eqs. (3), if the change rate of the phase along a horizontal direction (e.g. X direction) is not zero at the interface between two heterogeneous mediums, the horizontal component of the wave vector of the reflection ray can be a sum of the horizontal component of the wave vector of the incident ray and the horizontal momentum associated with the interface structure. As a result, the incident angle does not equal the reflection angle, and anomalous reflection occurs.

However, for a metasurface, both common reflection and anomalous reflection induced by an incident electromagnetic wave may occur simultaneously. In the following exemplified embodiments, unless otherwise indicated, the reflections as described all refer to anomalous reflections caused by the nanoscale optical component according to the invention.

Design of the Nanoscale Optical Component

Figure 2:
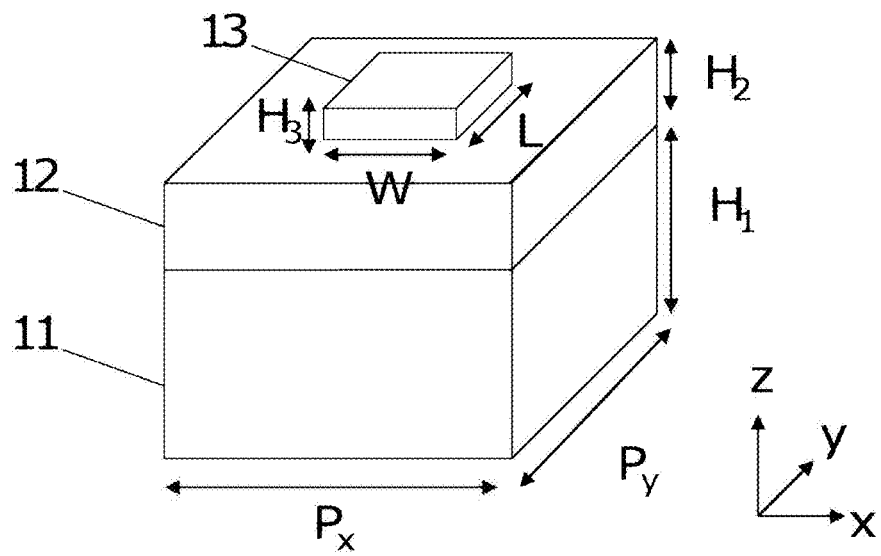
FIG. 2 shows an exemplary resonant unit of a nanoscale optical component according to the present invention.
Figure 3A:
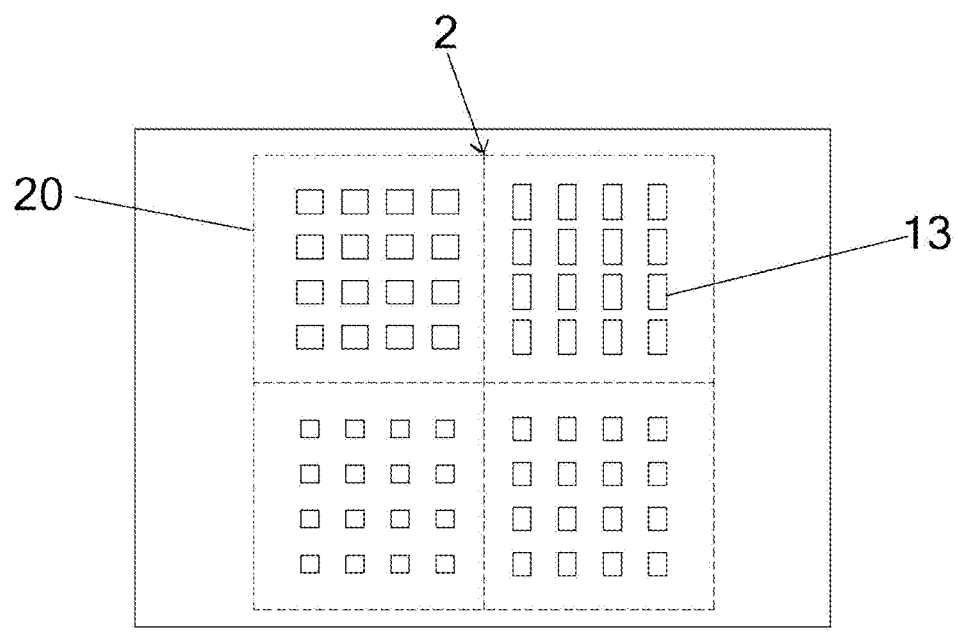
FIG. 3A is a schematic view showing a primary nanorod array and nanorod sub-arrays of the nanoscale optical component according to the present invention.

With references to FIG. 2 and FIGS. 3A to 3B, a nanoscale optical component according to one embodiment of the invention with its stacked structure and array arrangements are provided. FIG. 2 shows a smallest unit cell (hereafter referred to as a resonant unit) of the nanoscale optical component according to the invention that is able to induce plasmon resonance. The resonant unit is stacked with layers including a metal layer 11, a dielectric layer 12 and a nanorod 13. The metal layer 11 is defined by a layer with an even thickness $H_1$, and one surface of the metal layer 11 serves as a reflection surface of said optical component. In general, the thickness $H_1$ of the metal layer 11 is less than the wavelengths of visible region, preferably in a range from 100 nm to 200 nm, such as 130 nm. The metal layer 11 can be made of one or more metals depending on the desired operating wavelength(s) for the optical component, preferably metals or semiconductor materials having high plasma frequency, such as aluminum and silver with a permittivity less than zero or semiconductor materials with high permittivity.

The dielectric layer 12 is formed at one side of the metal layer 11. For example, the dielectric layer 12 can be formed on the reflection surface of the metal layer 11. The dielectric layer 12 is defined by a layer with an even thickness $H_2$, wherein the thickness $H_2$ is less than the wavelengths of visible region, preferably in a range of 5 nm to 100 nm, such as 30 nm. In general, the dielectric layer 12 is made of a material transparent to visible light spectrum, and can be selected from a group consisting of insulators or semiconductor materials with a permittivity larger than zero, such as silicon ($SiO_2$), magnesium fluoride ($MgF_2$), aluminum oxide ($Al_2O_3$), hafnium oxide ($HfO_2$), etc. For semiconductor materials with a high permittivity, their optical properties may resemble those of metals. For semiconductor materials with a permittivity larger than zero, their optical properties may resemble those of dielectrics. The dielectric layer 12 has a carrying surface which corresponds to the surface where the dielectric layer 12 and the metal layer 11 interface. As shown in FIG. 3A, one or more nanorods can be formed on the carrying surface of the dielectric layer 12.

As can be seen in FIG. 2, the resonant unit has a length $P_x$ extending along the x-direction and another length $P_y$ extending along the y-direction, both of which define the horizontal dimensions of the resonant unit. In general, $P_x$ and/or $P_y$ may be less than twice the operating wavelength of the optical component. For example, $P_x=P_y=200$ nm. The nanorod 13 is defined by a length L, a width W and a thickness $H_3$, wherein the length L is substantially parallel to $P_y$ but shorter than it, while the width W is substantially parallel to Px but shorter than it. Thus, the nanorod 13 occupies an area that is smaller than or does not exceed the area defined by $P_x$ and $P_y$. Generally, $L \geq W > H_3$. The thickness $H_3$ is less than the wavelengths of visible region, preferably in a range of 10 nm to 100 nm. For an exemplified nanorod in an embodiment, L can fall within a range of 50 nm to 180 nm, W can be 50 nm while $H_3$ can be 25 nm. As shown in FIG. 2, the nanorod 13 has a substantially rectangular shape whose length direction and width direction are significantly associated with the resonance direction induced by the incident electromagnetic wave. In some embodiments of the present invention, said nanorod 13 can be defined by other side lengths, such as a circumference together with a thickness. The nanorod 13 can be made of metal, such as aluminum, silver or gold, and/or semiconductor materials. In particular, if the nanorod 13 is made of aluminum, a broader range of the resonance spectrum covering the visible region (400 nm to 700 nm) or even the infrared and/or ultraviolet region can be obtained.

In some embodiments, the nanoscale optical component according to the present invention may include other layers in its structure, such as a substrate, or a buffer layer formed between a substrate and the metal layer 11. In general, the layer structure as described above can be fabricated with conventional approaches, such as e-beam lithography, nanoimprint lithography or ion beam milling, and thus the description thereof is omitted for brevity.

Referring to FIG. 3A, the optical component according to the present invention includes an array structure which is composed of a plurality of resonant units of FIG. 2. Said array structure includes a plurality of primary nanorod arrays 2 (only one shown in FIG. 3A), and each of the primary nanorod arrays 2 further includes several sub-arrays 20 (there are four shown in FIG. 3A). Each sub-array 20 contains an array of identical nanorods 13. That is, all of the nanorods 13 within the sub-array 20 have the same length L and are arranged periodically along both the x-direction and the y-direction. For example, a two-dimensional 4×4 nanorod array is shown in each sub-array 20. The side length of each sub-array 20 can be the sum of the side lengths ($P_x$, $P_y$) of the resonant units defining the sub-array 20. For example, if $P_x=200$ nm, the side length of the sub-array for the 4×4 nanorod array can be 800 nm. The nanorods 13 contained in the sub-array 20 are generally oriented in the same direction, which enables the sub-array 20 to achieve specific resonance effect in a particular direction, and thereby to achieve modulation of reflectance and phase for the incident wave. The relation between the nanorod length L and the operating wavelengths, in particular with respect to the reflectance and phase modulation, will be described later in the paragraphs below.

The nanoscale optical component according to the present invention includes a plurality of pixels, each pixel is defined by a primary nanorod array 2. The pixels are associated with one or more patterns recorded in the optical component. Each pixel is defined by the primary nanorod array 2 composed of a plurality of sub-arrays 20. The pixel may include at least three nanorod sub-arrays, each of which has a specific nanorod length different from that of another sub-array. As can be seen in FIG. 3A, in the 2×2 sub-arrays, any three of the sub-arrays have three respective nanorod lengths. The nanorods 13 are disposed on a part of a peripheral surface of the optical component, arranged periodically along the x-direction and the y-direction. On a peripheral surface of the optical component, there may be several rows and columns of nanorods 13 arranged in one or more arrays. The optical component may comprise or may be composed of several rows and columns of resonant units. All of the nanorods 13 contained in the sub-arrays have substantially the same width W and thickness $H_3$, and each nanorod 13 is located in a respective area of the resonant unit (i.e. defined by $P_x$ and $P_y$). Two adjacent nanorods in the x-direction have a spacing which equals $P_x$, and thus the nanorods along the x-direction are arranged periodically over the sub-arrays 20. The primary array 2 may include nanorods with at least two different lengths L in the respective sub-arrays 20.

FIG. 3B is an SEM image with a scale bar of 1 μm, showing a partial top view of some nanorod arrays of the optical component according to the present invention. As can be seen in FIG. 3B, a pixel may be composed of 2×2 adjoining sub-arrays 20(R), 20(G), 20(B) and 20(R)'. That is, the pixel has at least two sub-arrays along the direction of the nanorod width and at least two sub-arrays along the direction of the nanorod length. Although other embodiments for the pixel are absent from the drawing, the pixel may be composed in several possible ways of permutation, such as in 2×3 or 3×4 arrangements. These sub-arrays 20(R), 20(G), 20(B) and 20(R)' can be divided into red sub-arrays 20(R) and 20 (R)', a blue sub-array 20 (B) and a green sub-array 20(G) according to their optical properties (i.e. plasmon resonance properties). For the red sub-arrays 20(R) and 20 (R)', the nanorods contained in the two respective sub-arrays may have the same nanorod length. This is to ensure a sufficient red light reflection which is generally weaker than the reflection of the blue and green sub-arrays. One or more operating wavelengths for each sub-array can be defined by the spectrum distribution associated with the sub-array, which can be seen in FIG. 7 and described later in the paragraphs below.

As shown in FIG. 3B, the pixel occupies an area defined by Λ×Λ (1600×1600 $nm^2$) that is composed of 2×2 sub-arrays 20(R), 20(G), 20(B) and 20(R)', wherein each sub-array is further composed of a 4×4 array of nanorods. In some embodiments of the present invention, the pixel can be composed of more sub-arrays having more than three different nanorod lengths set in the respective nanorod sub-arrays.

In some embodiments, the optical component according to the present invention may include several red sub-arrays, green sub-arrays and blue sub-arrays depending on the optical properties or resonance performance of the sub-arrays contained in the optical component. In other embodiments, the red sub-arrays of the optical component may have two different nanorod lengths constituting different red sub-arrays, such as the red sub-arrays 20(R) and 20(R)' shown in FIG. 3B. Similarly, it is possible to design the green sub-arrays and/or the blue sub-arrays with different nanorod lengths. In this way, the nanoscale optical component according to the present invention is able to implement two-level phase modulation for an incident wave. As such, with a monochromatic operating wavelength, the two-level optical component according to the present invention is able to provide two different resonant modes that may produce two reflections for an incident wave. In the case that the three primary colors (RGB) are used as the operating wavelengths, the nanoscale optical component may provide six different resonant modes.

With reference to FIGS. 4(*a*) and 4(*b*), a reflectance and phase distribution as a function of wavelength and length L of nanorod are illustrated ($H_1$, $H_2$, $H_3$ and W are fixed values here). As can be seen in the figures, the resonance spectral range may be from 375 nm to 800 nm. The value of reflectance is associated with the amplitude of the reflection wave, and the amount of phase is associated with the reflection angle of the reflection wave (i.e. $\theta_r$, as presented in Eq. (2)), since any phase shift or delay will influence the wavefront's propagation across the nanoscale structure. According to the reflection spectrum and phase distribution, a desired reflectance and phase control for each resonant unit of the nanoscale optical component according to the present invention can be determined by the nanorod length L thereof. For example, as shown in FIGS. 4(*a*) and 4(*b*), each single point marked in the distribution, such as the blue circle, green triangle and red square, represents a type of the resonant unit that constitutes the nanoscale optical component according to the present invention.

Figure 3:
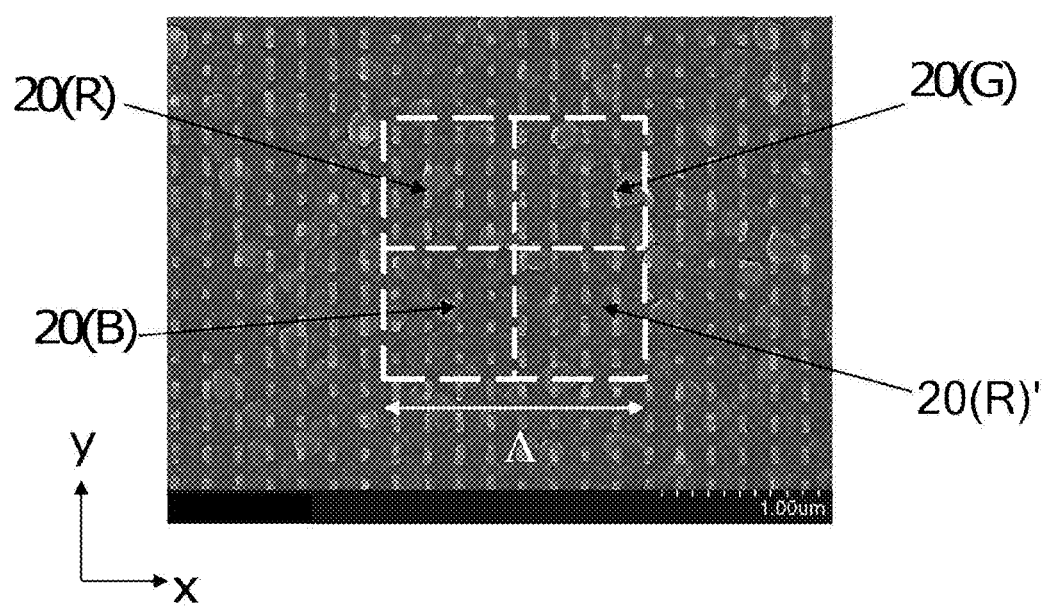
FIG. 3B is an SEM image of a surface array of the nanoscale optical component composed of the resonant units shown in FIG. 2, and Λ represents a side length of a pixel.

For example, the two blue circles refer respectively to the nanorod lengths of 55 nm and 70 nm, and with such configuration their resonant units or sub-arrays constituted respectively may produce a phase shift of π in between, for a specific operating wavelength in the blue region. Also, similar effect may occur as indicated by the green triangles with the respective nanorod lengths of 84 nm and 104 nm, or as indicated by the red squares with the respective nanorod lengths of 113 nm and 128 nm. With this design, the nanoscale optical component can provide six resonant modes. However, depending on the selection of nanorod lengths, the nanoscale optical component according to the present invention can provide more resonant modes. Furthermore, the nanorods may be configured in multiple orientations. For example, referring back to FIG. 3, the nanorods contained in one part of the sub-arrays may have their nanorod length L extending along the x-direction, while the nanorods contained in another part of the sub-arrays have their nanorod length L extending along the y-direction. For another example, two arrays of nanorods contained in two respective sub-arrays may form an angle with respect to each other. As such, the nanoscale optical component according to the present invention is able to produce resonance in more directions with the foregoing configuration.

With reference to FIG. 4(*c*), relations concerning the reflectance and phase versus nanorod length are shown, with the operating wavelengths fixed at 405 nm, 532 nm and 658 nm. As indicated in the figure, the lowest reflectance for the wavelength of 405 nm occurs when the nanorod length is set to a range from 55 nm to 70 nm; the lowest reflectance for the wavelength of 532 nm occurs when the nanorod length is set to a range from 84 nm to 104 nm; the lowest reflectance for the wavelength of 658 nm occurs when the nanorod length is set to a range from 113 nm to 128 nm.

It can be understood from FIG. 4 that, the optical reflection and phase shift over the visible spectrum for each resonant unit or sub-array are varied nonlinearly depending on the nanorod length thereof. Such nonlinear variations can be determined based at least on the size of nanorods, the orientation of nanorod arrays and/or the selection of the dielectric layer and the metal layer.

To be specific, the nanoscale optical component according to the present invention can be a reflection mirror having a metasurface. The storage of patterns may be established by using several pixels composed of different nanorod sub-arrays to form the pattern.

Image Reconstruction

Figure 5:
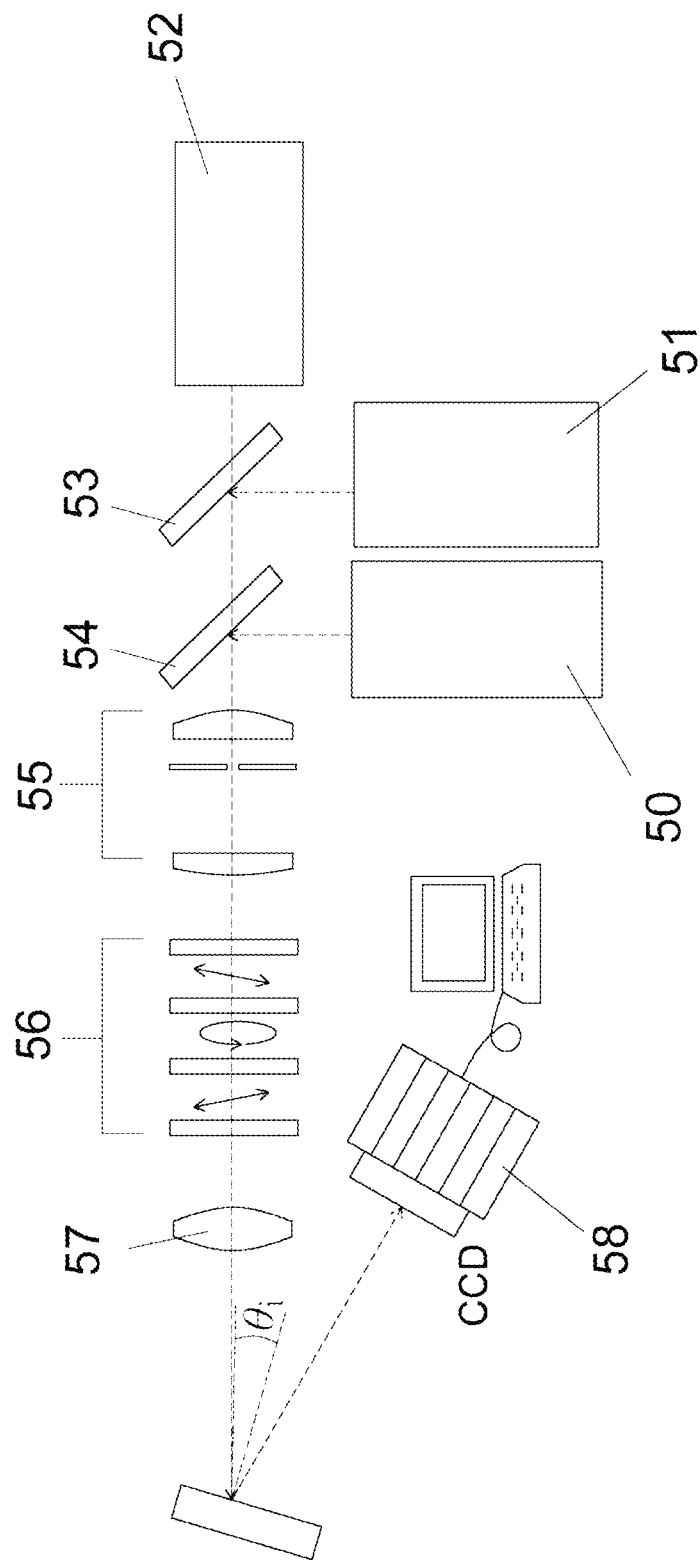
FIG. 5 is a schematic view showing an image reconstruction system used to reconstruct images recorded with the nanoscale optical component according to the invention.

FIG. 5 illustrates an exemplary image reconstruction system which is utilized to reconstruct one or more images recorded in the nanoscale optical component according to the present invention. The system utilizes three laser diodes 50, 51 and 52 to generate respective laser beams at the wavelengths of 405 nm, 532 nm and 658 nm as the operating wavelengths for reconstructing the one or more images. The beams are combined as one major after successively passing through a first dichromic mirror 53 and a second dichromic mirror 54. A beam adjusting component 55 including at least two lenses and a pin hole is configured to adjust the spot size of the major beam. A polarization modulating component 56 including one or more polarizers, quarter-wave plates and filters is configured to control polarization of the major beam. The polarized beam is then focused on a focal plane by a focal lens 57. The nanoscale optical component according to the present invention is placed at the focal plane of the focal lens 57, where a part of the metasurface of the nanoscale optical component overlaps with the focal plane to receive the polarized and focused beam. The incident beam is then reflected from the metasurface with modulated phase and recorded by a CCD camera 58 for further processing.

Figures 6A, 6B, 6C, 6D, 6E, 6F:
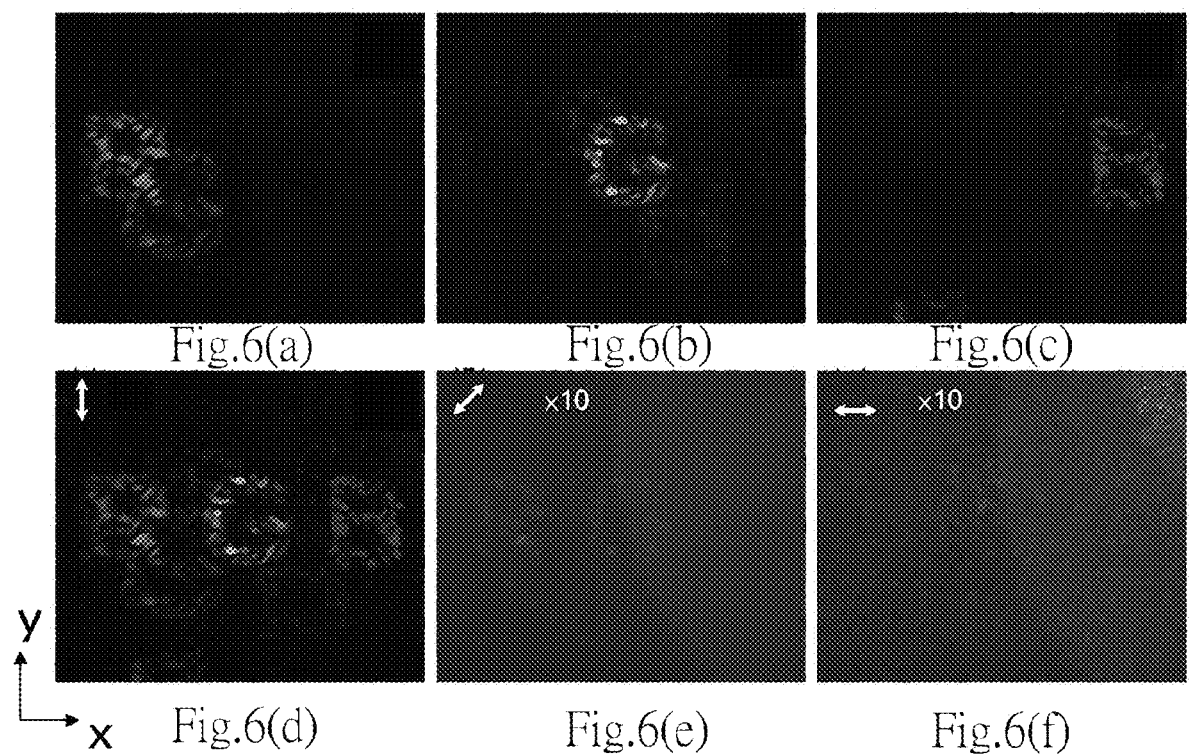
FIGS. 6(a) to 6(c) illustrate a series of reconstructed images based on the nanoscale optical component according to the invention; the images are reconstructed by y-polarized light beams (including beams from red, green and blue light sources).
FIGS. 6(d) to 6(f) illustrate a series of reconstructed images based on the nanoscale optical component according to the invention; the images are reconstructed by y-polarized, 45°-polarized and x-polarized light beams respectively.

FIGS. 6(a) to 6(c) exemplify a series of reconstructed images based on the foregoing system and the configuration shown in FIG. 3B at y-polarized operating wavelengths of 405 nm, 532 nm and 658 nm respectively. The different groups of sub-arrays with specific operating wavelength or spectrum (such as 20(R), 20(G), and 20(B) shown in FIG. 3B) produce one or more RGB images respectively in response to their corresponding incident wavelength, and the patterns of these reconstructed images are associated with the arrangement of the pixels.

FIGS. 6(d) to 6(f) exemplify a series of reconstructed images based on the foregoing system and the configuration shown in FIG. 3B using y-polarized, 45°-polarized and x-polarized three-color laser beams respectively. As can be seen, the reconstructed image gradually disappears when the operating laser beam turns from y-polarization to x-polarization. The polarization direction of the incident beam for image reconstruction can be determined by the direction of the nanorod length L in the optical component.

Aluminum Nanorods Versus Reflectance Spectra

According to the foregoing description, aluminum nanorods constituting the metasurface according to the present invention can expand the resonance spectral range to 375 nm, allowing for applications in the visible spectrum. In addition, the reflectance spectrum can be determined by the nanorod size, particularly by the nanorod length L.

Figures 7A, 7B, 7C:
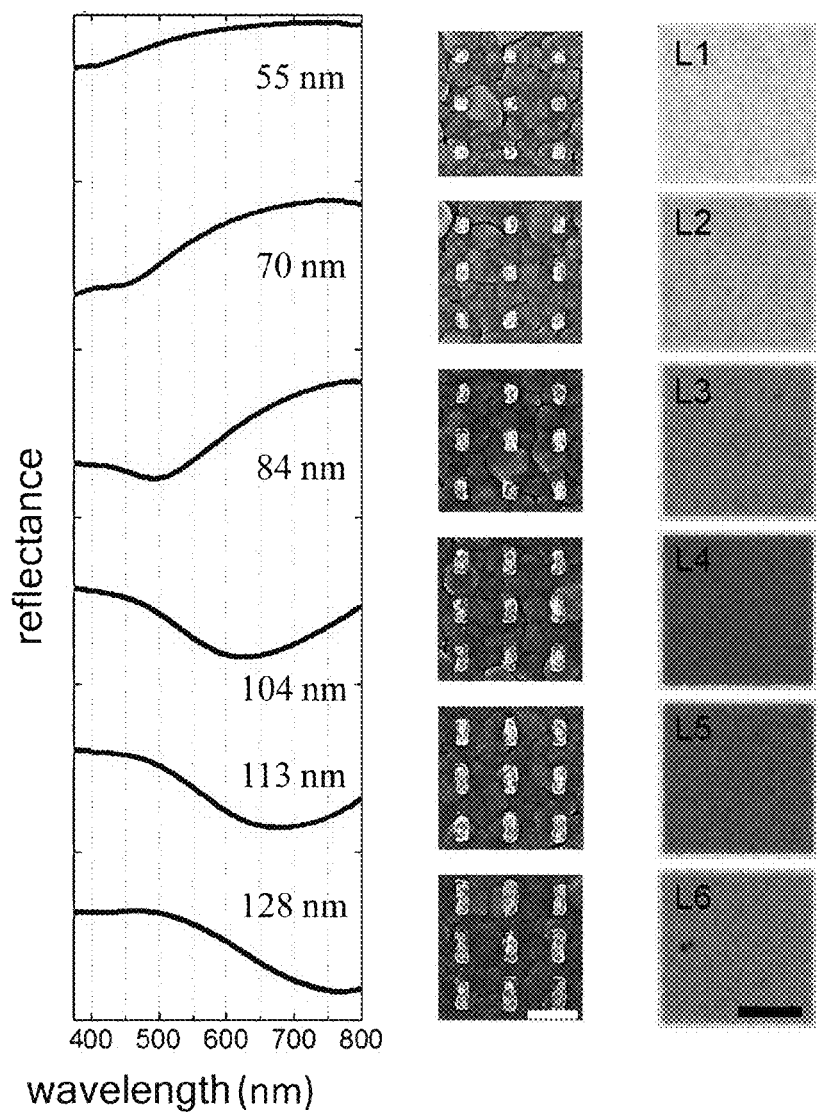
FIGS. 7(a) to 7(c) illustrate relations between reflectance and nanorod length over various operating wavelengths with respect to the nanoscale optical component according to the invention, as well as the reflective images in SEM images.

FIGS. 7(a) and 7(c) show the different nanorod arrays contained in the optical component and their optical properties. FIG. 7(b) shows a series of SEM images of part of the nanorod sub-arrays in six sizes. These nanorod sub-arrays are formed based on a silicon layer (the dielectric layer) with a thickness of 30 nm and an aluminum layer (the metal layer) with a thickness of 130 nm. These SEM images are shown with a 200 nm scale bar and include images of nanorod sub-arrays, from top to the bottom, having rod lengths $L_1$=55 nm, $L_2$=70 nm, $L_3$=84 nm, $L_4$=104 nm, $L_5$=113 nm and $L_6$=126 nm, which respectively correspond to the reflectance spectra shown in FIG. 7(a) and reflection images shown in FIG. 7(c). FIG. 7(c), where a scale bar of 20 μm is included, shows reflective images of the optical component based on the nanorod sub-arrays shown in FIG. 7(b).

As can be seen in the figure, each of the reflectance spectra of visible light has a valley point (associated with the resonance) which shifts toward longer wavelength as its rod length increases, resulting in reflective color changes from yellow through orange and blue to cyan corresponding to the complementary colors of each plasmonic band. In other words, the reflective color of the nanorod sub-array (such as the sub-array 20) can be determined by the nanorod length. For example, but it should not be construed as limiting the scope of the invention, the reflective color of nanorod sub-arrays change from yellow through orange when the rod length L is set to a range of 55-84 nm (including 55-70 nm and 70-84 nm); the reflective color of nanorod sub-arrays changes from blue through cyan when the rod length L is set to a range of 104-128 nm (including 104-113 nm and 113-128 nm). Although it is not disclosed in the drawings, those having ordinary knowledge in the art should understand that the nanorod width, thickness or density of nanorods in the sub-array may also influence the reflectance spectrum for the optical component according to the present invention. Also, the rod length and its corresponding reflective color disclosed herein are not meant to limit the scope of the invention. Even in other embodiments that the nanorods have the same length in different sub-arrays, the sub-arrays may appear various shifts in resonance spectra according to various array arrangements or selection of materials.

The nanoscale optical component according to the present invention employs aluminum nanorods having higher plasma frequency to yield plasmon resonances across a broader range of the spectrum which even includes the blue light range, meaning that applications of the nanoscale optical component can be expanded. In addition, the nanoscale optical component according to the present invention can be employed in hologram applications. A hologram can record one or more patterns therein. Each of the recorded patterns can be composed of several pixels that are constituted by several sub-arrays having various nanorod lengths L respectively adapted for specific operating wavelengths, so that image reconstruction with WDM (wavelength division multiplexing) operations can be realized. Based on different operating wavelengths of the beams reflected respectively with specific reflection angles, the one or more reconstructed images projected from the nanoscale optical component according to the invention can have patterns distributed in a particular manner. Accordingly, such optical component can be used to fabricate hologram security labels in full colors. And given that the feature of WDM operations can be realized, the nanoscale optical component according to the present invention can also be applied to display units to realize full-color display or full-color image projection, for example. Moreover, a hologram applying a nanoscale optical component according to the present invention can be a two-level hologram which requires two different nanorod lengths for a single color, and thereby a phase modulation can be achieved for the single color with a phase shift of π or 180 degrees. Likewise, a three-level hologram requires three different nanorod lengths for a single color and can achieve a phase modulation up to 2π/3 or 120 degrees, while a four-level hologram requires four nanorod lengths for a single color and can achieve a phase modulation up to π/2 or 90 degrees. Other changes or modifications to the phase levels of a hologram in connection with phase modulations can be derived with common knowledge in the art to which the invention pertains.

Design of Achromatic Nanoscale Optical Component

The achromatic optical component according to the invention is also accomplished based on a plasmonic metasurface approach. With the near-field coupling between adjacent wavelengths and nanorods (or so-called nanoantennas or integrated unit elements), the phase difference accumulated during light propagation can be compensated, and therefore light rays at different wavelengths can be focused on the same focal plane in free space. Furthermore, linear polarized incident beams can be converted into circular polarized beams.

Figure 8A:
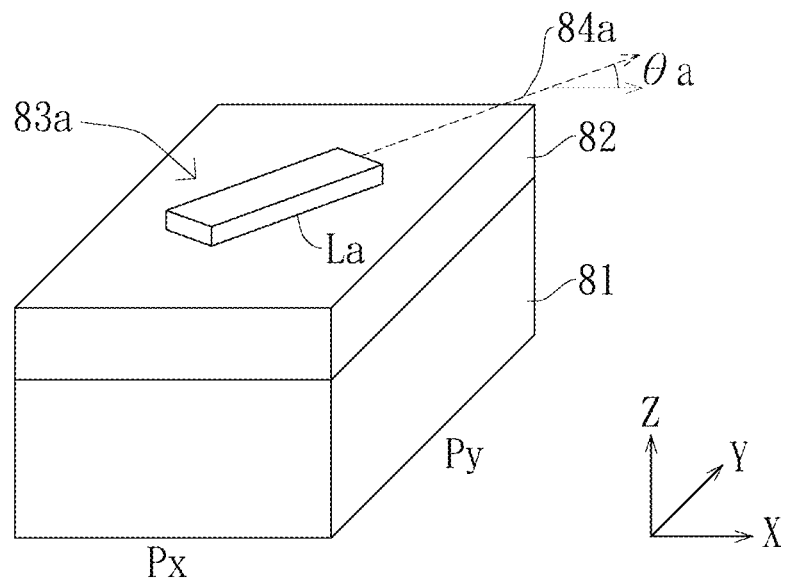
FIGS. 8(a) to 8(c) illustrate resonant units of an achromatic nanoscale optical component according to the invention.
Figure 8B:
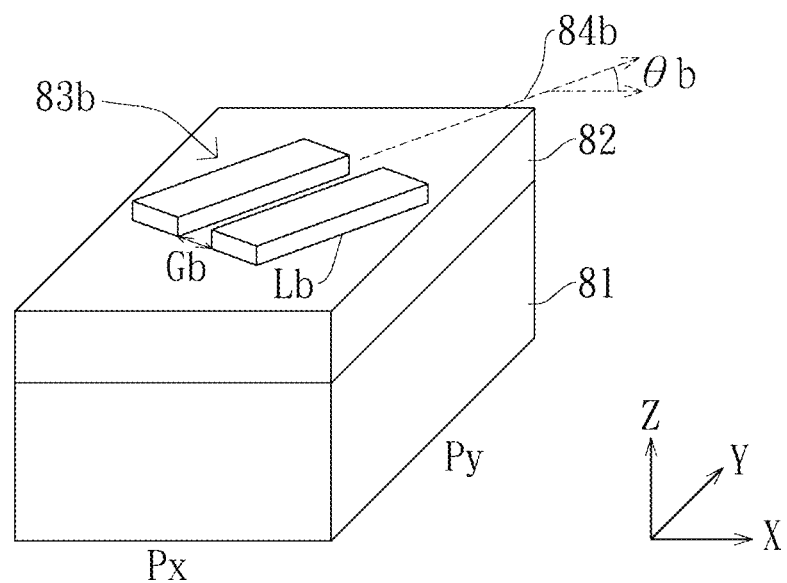
Figure 8C:
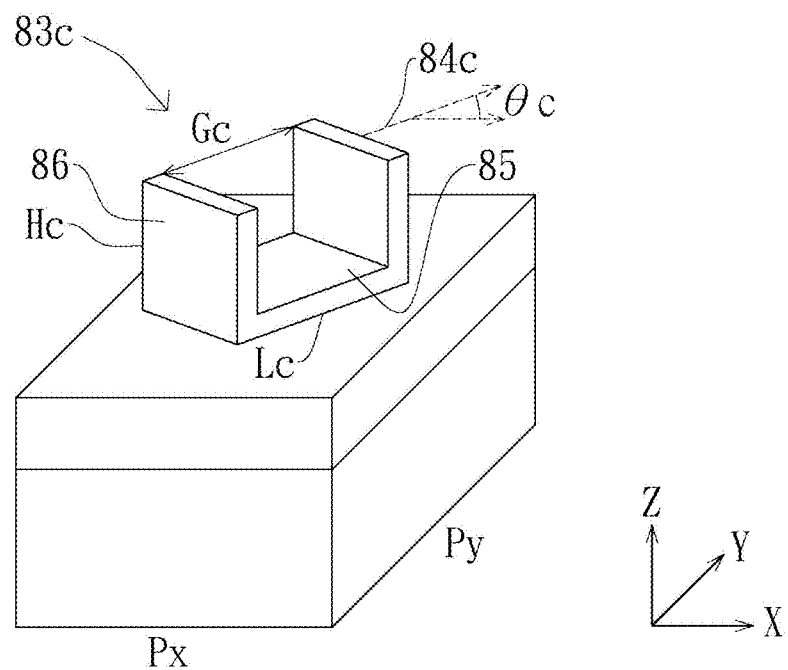

FIGS. 8(a), 8(b) and 8(c) respectively illustrate an independent resonant unit constituting the achromatic nanoscale optical component according to the invention. Like the one shown in FIG. 2, each of these resonant units has a stacked structure including a metal layer 81 and a dielectric layer 82. The stacked structure further includes one or more nanorods 83a, 83b or 83c. As a reflective optical component, the metal layer 81 is an even layer with a thickness, and an interface between the metal layer 81 and the dielectric layer 82 serves as a reflection surface of the optical component. In general, the thickness of the metal layer 81 is less than any wavelength in visible spectrum, preferably in a range from 100 to 200 nm, such as 130 nm. Material of the metal layer 81 can be selected from adequate metals depending on an operative wavelength of the optical component. Preferably, the material can be metal or semiconductor with high frequency plasmonic resonance, such as aluminum, silver or any semiconductors with a high permittivity. In other embodiments of the invention, as a transparent optical component, said nanorod 83 can be formed on a glass substrate, such as BK7 glass, without forming said metal layer. The lateral scale of the resonant unit can be defined by an edge $P_x$ along the x-direction and an edge $P_y$ along the y-direction. For example, $P_x = P_y = 550$ nm. Generally, $P_x$ and/or $P_y$ is less than two times the scale of said operative wavelength.

The dielectric layer 82 is formed on one side of the metal layer 81. The dielectric layer 82 is an even layer having a thickness less than any wavelength in visible spectrum, preferably in a range from 5 to 100 nm, such as 30 nm. Generally, the dielectric layer 82 is made of visibly transparent material which can be selected from electrically insulating materials or semiconductors with a permittivity larger than zero, such as $SiO_2$, $MgF_2$, $Al_2O_3$, and $HfO_2$. The dielectric layer 82 has a supporting surface which is opposite to the interface where the metal layer 81 and the dielectric layer 82 engage together. One or more nanorod(s) 83 is/are then patterned on the supporting surface of the dielectric layer 82.

Achromatic optical component according to the invention includes a nanorod array formed on a surface of a dielectric layer, and the nanorod array is composed of one or more arrayed nanorod patterns, each of which being defined by one or more nanorods. The nanorod array extends along a lateral direction (the x-direction) and a vertical direction (the y-direction), as will be described later.

The pattern of the nanorod 83a shown in FIG. 8(a) is similar to that of the nanorod 13 shown in FIG. 2, but the nanorod 83a is orientated at an angle with respect to the x-direction or y-direction. FIG. 8(b) shows two parallel nanorods 83b, and from the two do not contact each other. FIG. 8(c) shows a nanorod pattern similar to a split ring and is formed by a nanorod with bumps at its both ends. More nanorod patterns may be incorporated in the invention, and they should not be limited by the embodiments illustrated in the drawings.

As can be seen in FIGS. 8(a) to 8(c), each nanorod pattern respectively has a longitudinal axis (84a, 84b, 84c) which is defined by the length ($L_a$, $L_b$ and $L_c$) of the nanorod defining the pattern. The longitudinal axis (84a, 84b, 84c) is parallel to the extending direction of the length ($L_a$, $L_b$ and $L_a$). An angle θ (θa, θb, θc) is defined between the longitudinal axis (84a, 84b, 84c) and a lateral direction of the array. Angle θ determines the orientation of the nanorod pattern in the array. The angle θ can be selected from an angle range as desired and may vary depending on the location of the nanorod pattern in the array. Thus, unlike the approach adopted for the resonant units shown in FIG. 3A, the metasurface here used for an achromatic optical component according to the invention utilizes nanorod structure turning at an angle and arranged in different orientations.

The nanorod pattern shown in FIG. 8(a) is composed of one single nanorod 83a which is similar to a rectangular structure defined by a length, a width and a height, wherein the length $L_a$ of the nanorod extends in a direction that defines the longitudinal axis 84a of the nanorod pattern. An angle θa, which may be any angle, is defined by the longitudinal axis 84a and an extending direction (the x-direction) of the array. The description for using a single nanorod in an independent resonant unit is mentioned in the foregoing content relevant to FIG. 2, and therefore repeated description is omitted for brevity.

The nanorod pattern shown in FIG. 8(b) includes two parallel nanorods 83b. In other embodiments, more nanorods can be included in the pattern, and the nanorods can be sized in different lengths. For example, in FIG. 8(b), the nanorod length $L_b$ may fall within a range from 30 nm to 530 nm, and a gap $G_b$ between neighboring nanorods is arranged, where $G_b$ can be approximately 10 to 100 nm. In another embodiment, the nanorod pattern may be similar to a "T" shape arrangement composed of two nanorods perpendicular to one another. That is, the width side of one nanorod faces against and is parallel to the length side of the other nanorod, and the two nanorods are separated by a gap. As can be seen in the figure, the nanorod pattern has a longitudinal axis 84b, and an angle θb, which may be any angle, is defined by the longitudinal axis 84b and an extending direction (the x-direction) of the nanorod array, wherein the longitudinal axis 84b is defined by the extending direction of the nanorod length $L_b$. Longitudinal axis 84b determines the orientation of the nanorod pattern in the nanorod array. In the case the pattern forms a "T" shape, an axis of symmetry for the pattern may be applied to determine an orientation thereof.

The nanorod pattern shown in FIG. 8(c) is a split ring including a nanorod 85 extending along a surface of a dielectric layer and two bumps 86 formed on both ends of the nanorod 85. The two bumps 86 and the nanorod 85 form a shape of "U" with an opening facing up. Each bump 86 generally extends along the z-direction, having a height $H_c$ of approximately 100 nm (including the thickness of the nanorod 85). Each bump 86 does not have to be in a rectangular structure; it may also have a ball shape. And the two bumps 86 at both ends are separated by a distance $G_c$, which is about 25 nm. In other embodiments, the nanorod pattern may include more similar structures in "U" shape. For example, several nanorods in the pattern as shown in FIG. 8(b) can be formed, while bumps extending along the z-direction may be grown at two ends of each of the nanorods; the lengths of the nanorods may not necessarily be identical, and the height of the bumps formed on one nanorod may not necessarily be the same as that of the other bumps formed on another nanorod. As can be seen in the figure, the nanorod pattern has a longitudinal axis 84c, and an angle θc, which may be any angle, is defined by the longitudinal axis 84c and an extending direction (the x-direction) of the nanorod array; the longitudinal axis 84c is determined by the extending direction of the length $L_c$ of the nanorod. The longitudinal axis 84c determines the orientation of the nanorod pattern in the nanorod array.

The layer structure as described above can be fabricated with conventional approaches, such as e-beam lithography, nanoimprint lithography or ion beam milling. For example, a published article, "Plasmon Coupling in Vertical Split-ring Resonator Metamolecules (Scientific Reports 5/9726 (2015)/DOI: 10.1038/srep09726)" discloses a method for fabricating nanorod patterns similar to that shown in FIG. 8(c) as well as the physical characteristics analysis thereof.

As described above, the meta-hologram nanoscale optical component is realized based on plasmonic resonance effect that affects the phase in light propagation; similarly, the achromatic optical component according to the invention achieves the goal of phase modulation further based on the geometric phase (or so-called Pancharatnam-Berry phase). The angle θ as shown in FIGS. 8(a) to 8(c) not only determines orientation of the nanorod patterns in a nanorod array, but also determines particular phase modulation given by the nanorod patterns. Performance presented by the nanoscale achromatic optical component may be influenced by the size and/or shape of said nanorod and the pattern formed, and is also associated with physical characteristics such as the density and periodicity within the array, which can affect the operative wavelength and bandwidth of the optical component.

Accordingly, by providing various nanorod patterns with multiple orientations, the phase modulation can be properly controlled and chromatic aberration correction can be achieved. FIGS. 9(a) to 9(e) respectively illustrate a portion of a nanorod array, showing the arrangements and rotation of nanorod patterns. Achromatic optical component according to the invention includes a nanorod array extending along a lateral direction and a vertical direction. The nanorod array includes several nanorods and/or nanorod patterns extending along a surface of said dielectric layer, and these nanorods and/or nanorod patterns are arranged to be separate from one another. An angle (from 0.0 to 90.0 degrees) can be defined between two neighboring nanorods or two neighboring nanorod patterns, and the angle varies depending on locations of the nanorod patterns along the lateral direction. In one embodiment, the angle defined between different nanorod patterns increases along the lateral direction, which means the extent of rotation of the nanorod patterns becomes even more obvious along the lateral direction.

In an embodiment of the invention, the nanorod array includes a plurality of nanorod patterns of the same type, and they extend along one or more extending directions (e.g. said lateral or vertical directions) defining the array, and the patterns of the same type are arranged to be adjacent to one another. And along the one or more extending directions defining the array, such as the lateral direction of the array, the arrangement of the nanorod patterns of the same type varies. FIGS. 9(a) to 9(e) respectively show a specific arrangement of a plurality of nanorod patterns of the same type along the lateral direction (the x-direction) of the array, wherein the periodicity can be determined by the size of a single resonant unit, such as $P_x$ or $P_y$ shown in FIG. 8(a). In the x-direction, a longitudinal axis of each of nanorod patterns of the same type and another longitudinal axis of a neighboring nanorod pattern of the same type define an angle therebetween. Although absence from the figure, it is understandable that an angle can be defined by a long axis of a nanorod pattern and another long axis of a neighboring pattern of the same type in x-direction. Said angle falls within a range from 0.0 to 90.0 degrees, preferably from 0.0 to 15.0 degrees. In an embodiment, the angle defined between the longitudinal axis of each nanorod pattern of the same type and the lateral direction gradually reduces along the lateral direction (the x-direction). In another embodiment, the angle defined between the longitudinal axis of each nanorod pattern of the same type and the lateral direction gradually increases along the lateral direction (the x-direction).

Figure 9A:
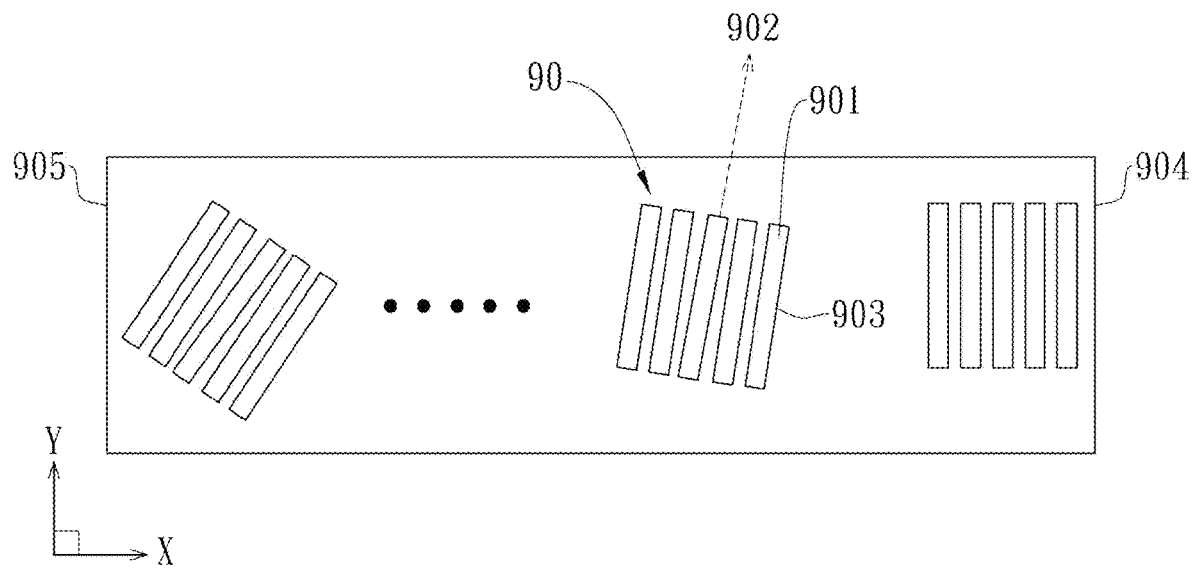
FIGS. 9(a) to 9(e) illustrate various nanorod arrangements for the achromatic nanoscale optical component according to the invention.

FIG. 9(a) shows multiple nanorod patterns 90 of the same type, and each of the nanorod patterns 90 is composed of five parallel nanorods 901. The nanorods 901 within each nanorod pattern 90 are separated from one another by a gap. In one embodiment, two adjacent nanorods 901 within the nanorod pattern 90 are separated by a gap of 25 nm, and each of the nanorods 901 within the nanorod pattern 90 has a length of 450 nm and a width of 40 nm. Each of the nanorod patterns 90 has a longitudinal axis 902 that is parallel to a length side 903 of the nanorod 901. Long axis 902 determines that the nanorod pattern 90 has an orientation within the array. Each of the nanorod patterns 90 arranged along the x-direction is orientated differently from the neighboring ones. An angle (hereinafter the "orientation angle") is defined by the longitudinal axis 902 of the nanorod pattern 90 and the x-direction; the angle is identical to θ shown in FIG. 8(a) and varies depending on the location in x-direction. In one embodiment, the orientation angle of each nanorod pattern 90 varies from 0 to 45 degrees from a distal end 904 to another distal end 905 along the x-direction. Though not illustrated in FIG. 9(a), there may be at least ten nanorod patterns 90 with mutually different orientation angles between the distal end 904 and the distal end 905.

Figure 9B:
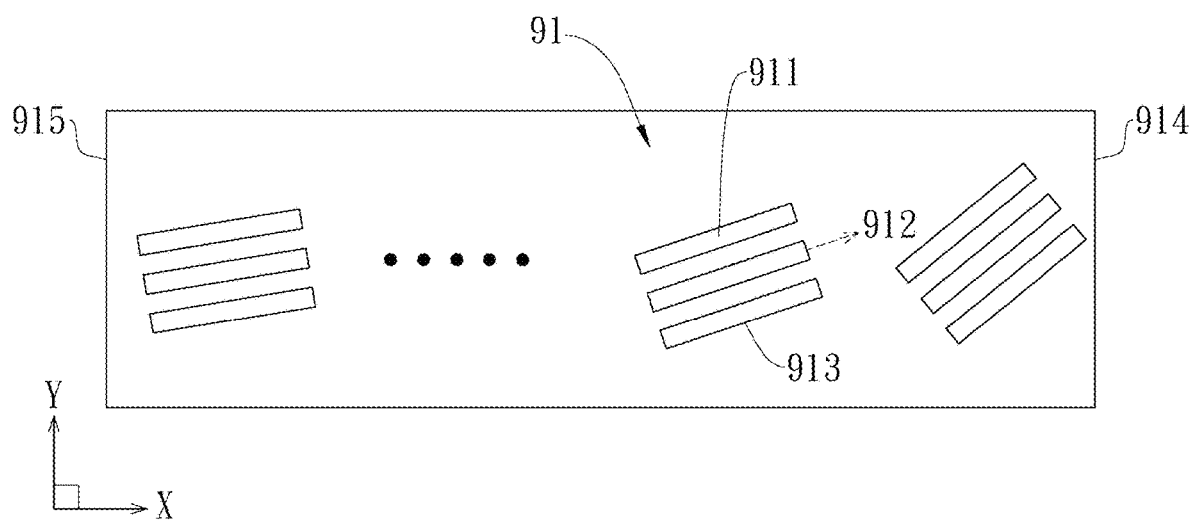

FIG. 9(b) shows multiple nanorod patterns 91 of the same type, and each of the nanorod patterns 91 is composed of three parallel nanorods 911. The nanorods 911 within a nanorod pattern 91 are separated from one another by a gap. In one embodiment, two adjacent nanorods 911 within the nanorod pattern 91 are separated by a gap of 35 nm, and each of the nanorods 911 within the pattern 91 has a length of 400 nm and a width of 70 nm. Each of the nanorod patterns 91 has a longitudinal axis 912 that is parallel to a length side 913 of the nanorod 911. Longitudinal axis 912 determines that the nanorod pattern 91 has an orientation within the array. Each of the nanorod patterns arranged along the x-direction is orientated differently from the neighboring ones. An orientation angle is defined by the longitudinal axis 912 of the nanorod pattern 91 and the x-direction, and the orientation angle of each nanorod pattern 91 varies depending on the location in x-direction. In one embodiment, the orientation angle of each nanorod pattern 91 varies from 0 to 45 degrees from a distal end 914 to another distal end 915 along the x-direction. Though not illustrated in FIG. 9(b), there may be at least ten nanorod patterns 91 (or fewer than the number of the nanorod patterns 90) with mutually different orientation angles between the distal end 914 and the distal end 915.

Figure 9C:
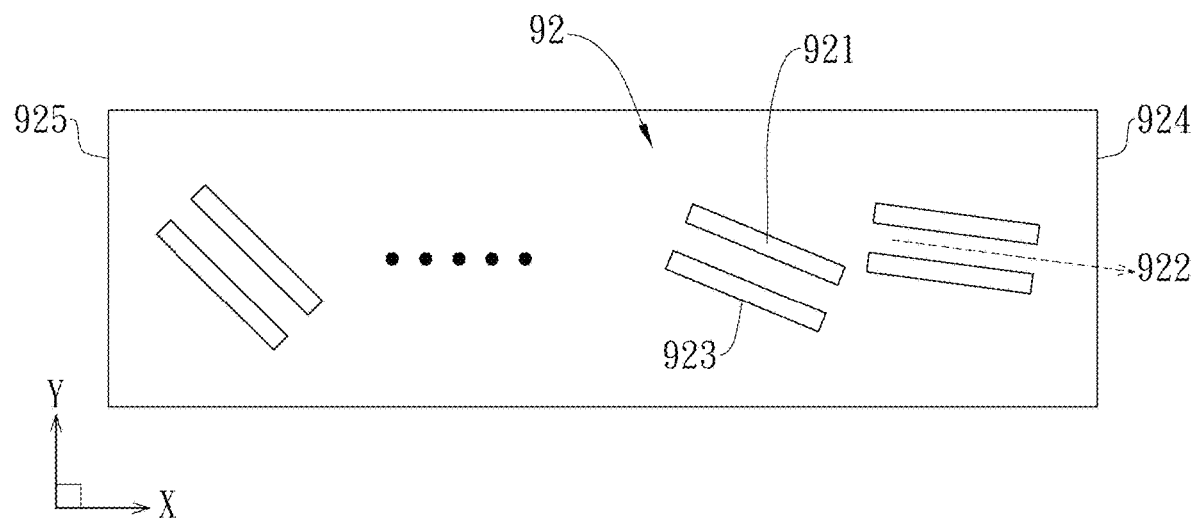
Figure 9D:
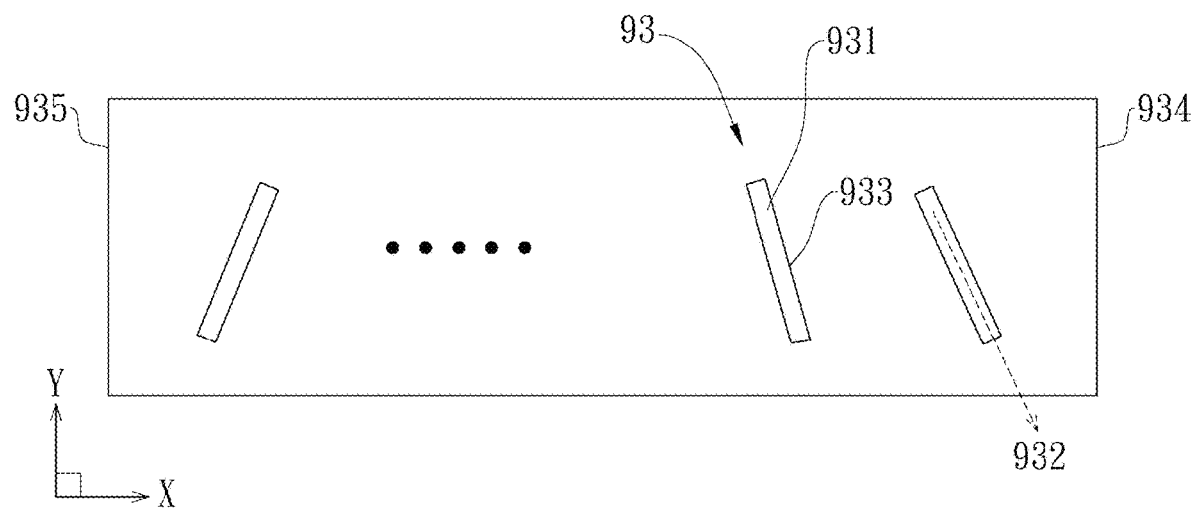
Figure 9E:
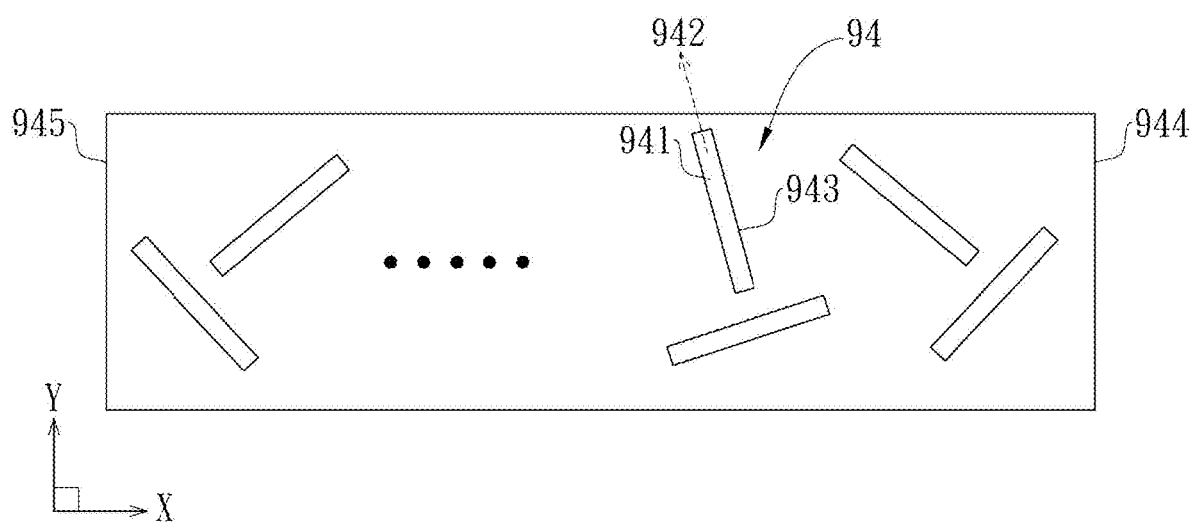

FIG. 9(c) shows multiple nanorod patterns 92 of the same type, and each of the nanorod patterns 92 is composed of two parallel nanorods 921. The nanorods 921 within a nanorod pattern 92 are separated from one another by a gap. In one embodiment, two adjacent nanorods 921 are separated by a gap of 40 nm, and each of the nanorods 921 has a length of 380 nm and a width of 170 nm. Each of the nanorod patterns 92 has a longitudinal axis 922 that is parallel to a length side 923 of the nanorod 921. Longitudinal axis 922 determines that the nanorod pattern 92 has an orientation within the array. Each of the nanorod patterns 92 arranged along the x-direction is orientated differently from the neighboring ones. An orientation angle is defined by the longitudinal axis 922 of the nanorod pattern 92 and the x-direction, and the orientation angle of each nanorod pattern 92 varies depending on the location in the x-direction. In one embodiment, the orientation angle of each nanorod pattern 92 varies from 0 to 45 degrees from a distal end 924 to another distal end 925 along the x-direction. Though not illustrated in FIG. 9(*c*), there may be at least ten nanorod patterns 92 (or fewer than the number of the nanorod patterns 91) with mutually different orientation angles between the distal end 924 and the distal end 925.

FIG. 9(*d*) shows multiple nanorod patterns 93 of the same type, and each of the nanorod patterns 93 is composed of one single nanorod 931. In one embodiment, each nanorod 931 has a length of 390 nm and a width of 240 nm. Each of the nanorod patterns 93 has a longitudinal axis 932 that is parallel to a length side 933 of the nanorod 931. Longitudinal axis 932 determines that the nanorod pattern 93 has an orientation within the array. Each of the nanorod patterns 93 arranged along the x-direction is orientated differently from the neighboring ones. An orientation angle is defined between the longitudinal axis 932 of the nanorod pattern 93 and the x-direction, and the orientation angle of each nanorod pattern 93 varies depending on the location in the x-direction. In one embodiment, the orientation angle of each nanorod pattern 93 varies from 0 to 45 degrees from a distal end 934 to another distal end 935 along the x-direction. Though not illustrated in FIG. 9(*d*), there may be at least ten nanorod patterns 93 (or fewer than the number of the nanorod patterns 92) with mutually different orientation angles between the distal end 934 and the distal end 935.

FIG. 9(*e*) shows multiple nanorod patterns 94 of the same type, and each of the nanorod patterns 94 is composed of two nanorods 941 arranged perpendicular to one another to form a shape similar to "T" as described above. In one embodiment, two adjacent nanorods 941 within a pattern 94 are separated by a gap of 35 to 40 nm; one of the nanorods 941 in the pattern 94 has a length of 330 to 370 nm and a width of 90 to 120 nm, while the other one of the nanorods 941 in the pattern 94 has a length of 170 to 245 nm and a width of 240 to 280 nm. Each of the nanorod patterns 94 has a longitudinal axis 942 that is parallel to a length side 943 of one of the nanorods 941 Longitudinal axis 942 determines that the nanorod pattern 94 has an orientation within the array. Each of the nanorod patterns 94 arranged along the x-direction is orientated differently from the neighboring ones. An orientation angle is defined by the longitudinal axis 942 of the nanorod pattern 94 and the x-direction, and the orientation angle of each nanorod pattern 94 varies depending on the location the x-direction. In one embodiment, the orientation angle varies from 0 to 45 degrees from a distal end 944 to another distal end 945 along the x-direction. Though not illustrated in FIG. 9(*e*), there may be at least ten nanorod patterns 94 (or fewer than the number of nanorod patterns 93) with mutually different orientation angles between the distal end 944 and the distal end 945.

Figure 10:
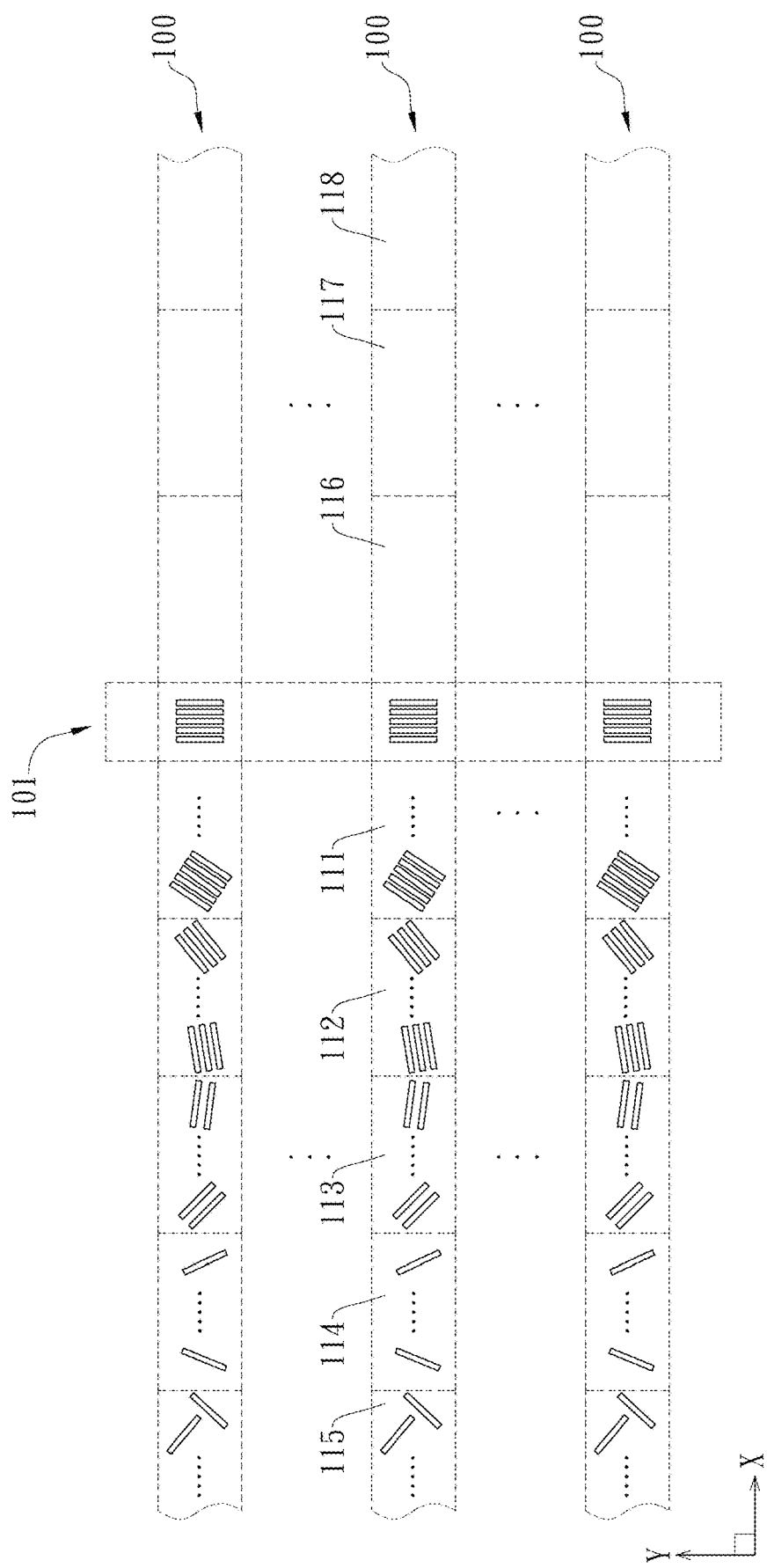
FIG. 10 illustrates a layout of nanorod arrangements for the achromatic nanoscale optical component according to the invention.

FIG. 10 illustrates an embodiment of an achromatic nanorod array according to the invention. As can be seen, the nanorod array extends along a lateral direction (the x-direction) and a vertical direction (the y-direction). Along the lateral direction the nanorod array includes a variety of nanorod patterns in each row 100, where the nanorod patterns of the same type are arranged adjacent to one another. Along the vertical direction, the nanorod array includes nanorod patterns of the same type, and all the nanorod patterns in a single column 101 have the same orientation.

In the lateral direction, the nanorod array includes multiple sets of nanorod patterns, and each set contains multiple nanorod patterns of the same type. As illustrated in FIG. 10, along the −x direction, a set of first nanorod patterns 111, a set of second nanorod patterns 112, a set of third nanorod patterns 113, a set of fourth nanorod patterns 114 and a set of fifth nanorod patterns 115 are arranged in order. In one embodiment, the set of first nanorod patterns 111 includes an arrangement of nanorod patterns of the same type as shown in FIG. 9(*a*), the set of second nanorod patterns 112 includes an arrangement of nanorod patterns of the same type as shown in FIG. 9(*b*), the set of third nanorod patterns 113 includes an arrangement of nanorod patterns of the same type as shown in FIG. 9(*c*), the set of fourth nanorod patterns 114 includes an arrangement of nanorod patterns of the same type as shown in FIG. 9(*d*), and the set of fifth patterns 115 includes an arrangement of nanorod patterns of the same type as shown in FIG. 9(*e*). In other embodiments, the order of the sets may not necessarily be determined by the number of nanorod(s) within the pattern. Preferably, the nanorod patterns within each of the sets 111 to 115 rotate at different angles in a clockwise manner along the −x direction. Preferably, the turning angles become even more obvious at the farther end of the −x direction.

In FIG. 10, along the x-direction, more sets of nanorod patterns 116, 117 and 118 may be arranged by repeating the foregoing sets of nanorod patterns but with a different order. For example, the set of nanorod patterns 116 may be a rearrangement of the set of nanorod patterns 111; the set of nanorod patterns 117 may be a rearrangement of the set of nanorod patterns 112; and the set of nanorod patterns 118 may be a rearrangement of the set of nanorod patterns 113. Preferably, the orientation of the nanorod patterns within each of the sets 116, 117 and 118 varies in a clockwise manner along the +x direction. The nanorod array shown in FIG. 10 may include more sets of nanorod patterns in the lateral direction. For example, in the −x direction, the set of fifth nanorod patterns 115 may be followed by similar nanorod patterns containing nanorods of different sizes. In addition, the nanorod array according to the invention may have particular periodicity. For example, the sets of nanorod patterns 111 to 118 or more sets may be repeated periodically along the lateral direction of the nanorod array.

In other embodiments of the invention, more or fewer types of nanorod patterns may be included in the foregoing nanorod array. For example, an achromatic nanorod array according to the invention may include nanorod patterns containing an arrangement or combination of the nanorods 83*c* as illustrated in FIG. 8(*c*).

An angle can be defined by the longitudinal axis (as defined above) of a nanorod pattern within a set of nanorod patterns of the same type and the longitudinal axis of a nanorod pattern within an adjacent set, since every two adjacent nanorod patterns arranged along the lateral direction in the nanorod array have different orientations. In other words, the nanorods and the nanorod patterns formed rotate relatively with respect to one another as they distribute laterally. Unlike the nanorod array shown in FIG. 3A, where the nanorods in the array have only one orientation, the achromatic nanorod array as illustrated in FIG. 10 contains multiple types of nanorods and nanorod patterns whose orientations vary in the lateral direction. As a result, a chip integrated with such achromatic nanorod array can generate plasmonic coupling effect more intensively and with more diversity, thereby achieving broadband phase modulation.

In application, the foregoing nanoscale optical component according to the invention can be used as one of the components constituting a lens assembly used in a mobile phone, digital camera, focus imaging system for microscope, or imaging system for optical lithography.

The invention should not be construed as limited to the embodiments set forth herein. A person having ordinary skill in the art may achieve other arrangements or combinations based at least in part on the teachings of the accompanying drawings without departing from the spirit of the invention. The foregoing embodiments and other embodiments would be obvious in view of the scope defined by the following claims.

What is claimed is:

1. An optical component, comprising:
   a dielectric layer; and
   a nanorod array, formed on a surface of the dielectric layer and composed of multiple subarrays, each of the multiple subarrays having rows and columns, each of the multiple subarrays consisting of multiple nanorod patterns of the same disposed side by side in both rows and columns, wherein each of the multiple nanorod patterns within each of the multiple subarrays is defined by one or more nanorods, and the multiple nanorod patterns of one subarray is different from that of other neighboring subarrays;
   wherein each of the multiple nanorod patterns comprises at least one pattern composed of at least two parallel nanorods separated from one another by a gap,
   wherein each of the multiple nanorod patterns has a longitudinal axis defining an orientation thereof within the respective subarray,
   wherein the multiple nanorod patterns of the same in each row of each of the multiple subarrays are of different orientations, and
   wherein the multiple nanorod patterns of the same in each column of each of the multiple subarrays are of identical orientation.

2. The optical component of claim 1, wherein each of the multiple nanorod patterns of one of the multiple subarrays is defined by a plurality of nanorods that are arranged in parallel form.

3. The optical component of claim 1, wherein each of the multiple nanorod patterns of one of the multiple subarrays is defined by a plurality of nanorods that are arranged perpendicular to each other.

4. The optical component of claim 1, wherein the material of said nanorod is selected from a group consisting of aluminum, silver, gold, and semiconductor.

5. The optical component of claim 1, further comprising a metal layer for providing a reflection surface on which the dielectric layer is formed.

6. The optical component of claim 5, wherein the metal layer is made of aluminum.

7. The optical component of claim 1, wherein the material of the dielectric layer is selected from a group consisting of silicon, magnesium fluoride, aluminum oxide, and hafnium oxide.

8. The optical component of claim 1, wherein the orientation defined by the longitudinal axis of each of the multiple nanorod patterns of the same varies depending on a row arrangement in the respective subarray.

9. The optical component of claim 1, wherein each of the multiple nanorod patterns of one of the multiple subarrays is a split ring composed of one nanorod extending along the dielectric layer with bumps formed with on two ends thereof.

10. The optical component of claim 9, wherein the bumps of said split ring extend in a direction perpendicular to the nanorod.

* * * * *